United States Patent [19]
Perkins

[11] Patent Number: 5,588,616
[45] Date of Patent: Dec. 31, 1996

[54] STATIC VENT UNITS

[75] Inventor: Terrence L. Perkins, Yeovil, England

[73] Assignee: Westland Helicopters Limited, Yeovil, England

[21] Appl. No.: 316,465

[22] Filed: Oct. 3, 1994

[30] Foreign Application Priority Data

Oct. 7, 1993 [GB] United Kingdom ................. 9320678

[51] Int. Cl.$^6$ ............................................... B64D 45/00
[52] U.S. Cl. ............................................ 244/1 R; 73/182
[58] Field of Search ................................ 244/1 R, 129.1, 244/130; 73/182, 212, 384, 388 R

[56] References Cited

U.S. PATENT DOCUMENTS 3,612,439  10/1971  Wingham .

*Primary Examiner*—Galen L. Barefoot
*Attorney, Agent, or Firm*—Larson & Taylor

[57] ABSTRACT

A static vent unit particularly for use in the side of a helicopter fuselage includes a support plate having a vent port and a strake extending generally horizontally below the vent port with an upper surface facing the vent port and generally perpendicular to the support plate surface, and airflow deflection means located below the strake to deflect airflow away from the strake when the unit is operating in an airflow from below the strake.

11 Claims, 3 Drawing Sheets

STATIC VENT UNITS

BACKGROUND OF THE INVENTION

1. Field of the Invention

This invention relates to static vent units and particularly to such units for use on helicopters.

2. Description of the Prior Art

Static vent units are used on both fixed and rotary wing aircraft to sense the ambient pressure of the air through which the aircraft is flying. This provides an indication of the altitude at which the aircraft is flying and, in combination with a pressure signal sensed by a forward facing pitot tube, an indication of the airspeed and, for fixed wing aircraft, the Mach number.

For this reason, static vent units have ideally to be located in a position where the local ambient pressure varies only with altitude and not with other features such as airspeed and relative wind direction, and are therefore usually located in the sides of an aircraft fuselage.

It has been proposed to locate such a sideways facing static vent unit in the nose of a helicopter in order to reduce the weight and complexity associated with long pipe runs to the more usual location in a helicopter tail boom. The nose location is subjected during certain phases of operation, e.g. the hover, to below ambient pressures, and a strake device has been located beneath the vent port to increase the pressure at the vent port and compensate for the negative pressure at the vent port location.

During a flight test of a helicopter fitted with such a static vent unit involving a high rate of descent, it was noted that the forward speed appeared to be slower than that indicated in the cockpit. Subsequent wind tunnel tests indicated that when subjected to positive airflow incidence (relative airflow from below) such as occurred during the descent, a pressure coefficient above the strake in the area of the vent port reduced significantly causing an incorrect indicated airspeed on the cockpit instruments.

U.S. Pat. No. 3,612,439 discloses a static vent unit for a high performance fixed wing aircraft designed to operate over a wide Mach number range extending to supersonic values. The unit includes compensation means in the form of an exterior shallow bulge having a thickness which decreases smoothly from a central region to the edges and includes a static vent formed by an aperture located in the surface of the bulge itself and offset in respect of a major axis of the vent unit.

The prior device operates to modify the airflow locally in operation so as to compensate a position error arising from variation in Mach number, and in respect of airflow from only one of two generally perpendicularly opposed directions.

The aforementioned problem associated with the inaccuracy of the sensed pressure from a static vent unit on a helicopter stems from the wide range of operating conditions of which the helicopter is capable. This means that the direction of relative airflow changes significantly resulting in a very wide airflow incidence range in which the static vent unit is required to operate.

An objective of this invention therefore is to provide in or for a helicopter a static vent unit which overcomes the aforesaid problem.

SUMMARY OF THE INVENTION

Accordingly, this invention provides a static vent unit located in the side of a helicopter fuselage with an outer surface of a support plate substantially flush with a fuselage surface, a vent port through the plate and a strake extending substantially horizontally below the vent port with an upper surface facing the vent port and generally perpendicular to said support plate surface, characterised by airflow deflection means located below the strake to deflect airflow away from the strake when the unit is operating in airflow at a positive incidence as herein defined.

The airflow deflection means may comprise a fairing below the perpendicularly extending upper surface of the strake and may be approximately equal in length and height to the upper surface. The fairing may have a radiussed nose portion.

An upper portion of the fairing may be located adjacent the strake and may slope downwardly to a generally sharp lower edge. Alternatively the fairing may be integral with the strake.

In another embodiment the fairing may be remote from the strake and may have an upper edge portion located perpendicular to a preselected positive airflow incidence angle measured from the horizontal surface of the strake upper surface.

Preferably the upper edge is a bluff edge and the angle may be between 20 degrees and 70 degrees. Preferably the angle is about 50 degrees.

The fairing may be generally semi-circular in plan, and an outer surface may be a smoothly curved convex surface.

BRIEF DESCRIPTION OF THE DRAWINGS

The invention will now be described by way of example only and with reference to the accompanying drawings in which.

DETAILED DESCRIPTION OF THE DRAWINGS

Figure 1:
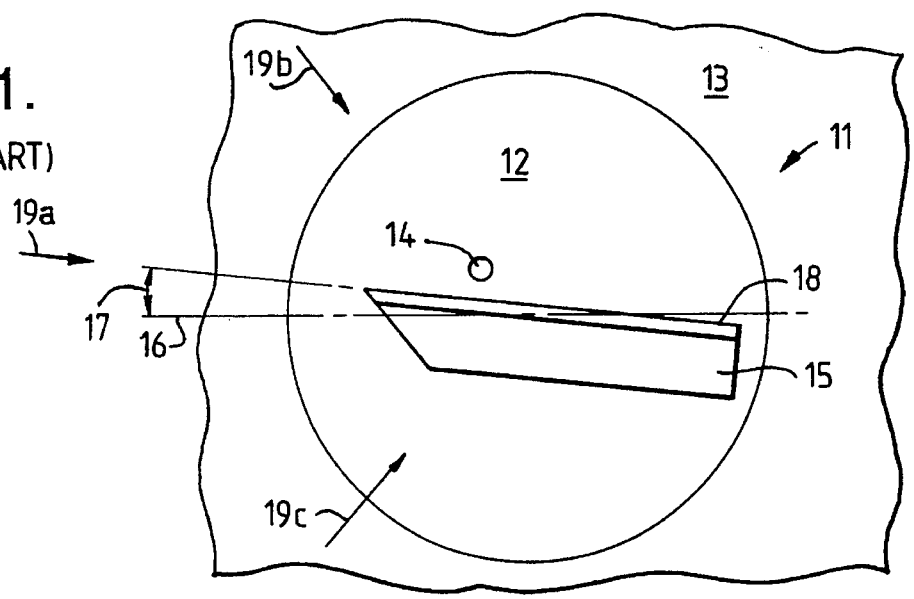
FIG. 1 is a fragmentary side elevation of a sideways facing static vent unit according to the prior art mounted on the nose of a helicopter fuselage.

Referring now to FIG. 1, a static vent unit generally indicated at 11, and constructed according to the prior art comprises a flat circular support plate 12 fitted flush with an external surface on the side of the nose area of a helicopter fuselage 13. The plate supports a circular vent port 14 for attachment in known manner to the helicopter instrumentation systems.

An elongated strake 15 having a right angled cross section is attached to the external surface of the support plate 12 and extends generally horizontally beneath the vent port 14 but with a slight nose up attitude relative a horizontal centreline 16 as indicated at 17. An upper surface 18 of the strake 15 faces the vent port 14 and extends generally perpendicular to the external surface of the support plate 12.

The location of the static vent unit 11 on the nose area of the helicopter is beneficial in that it reduces the weight and complexity associated with long pipe runs to the tail boom where the units have previously been located. However this does mean that in certain operating conditions such as the hover, the static vent unit 11 is located in an area of below ambient pressure and the strake 15 has been introduced to compensate by increasing pressure in the area of the vent port 14 to offset the effects of the negative pressure at the location of the static vent unit 11 during such phases of operation.

However, during flight testing of a particular helicopter involving a high rate of descent the pilot became aware that the forward airspeed appeared to be slower than that indicated on the cockpit instrumentation. As a result, the pilot realised that the helicopter was about to enter the potentially dangerous vortex ring state whereas the indicated forward airspeed was well above the critical speed.

Figure 7:
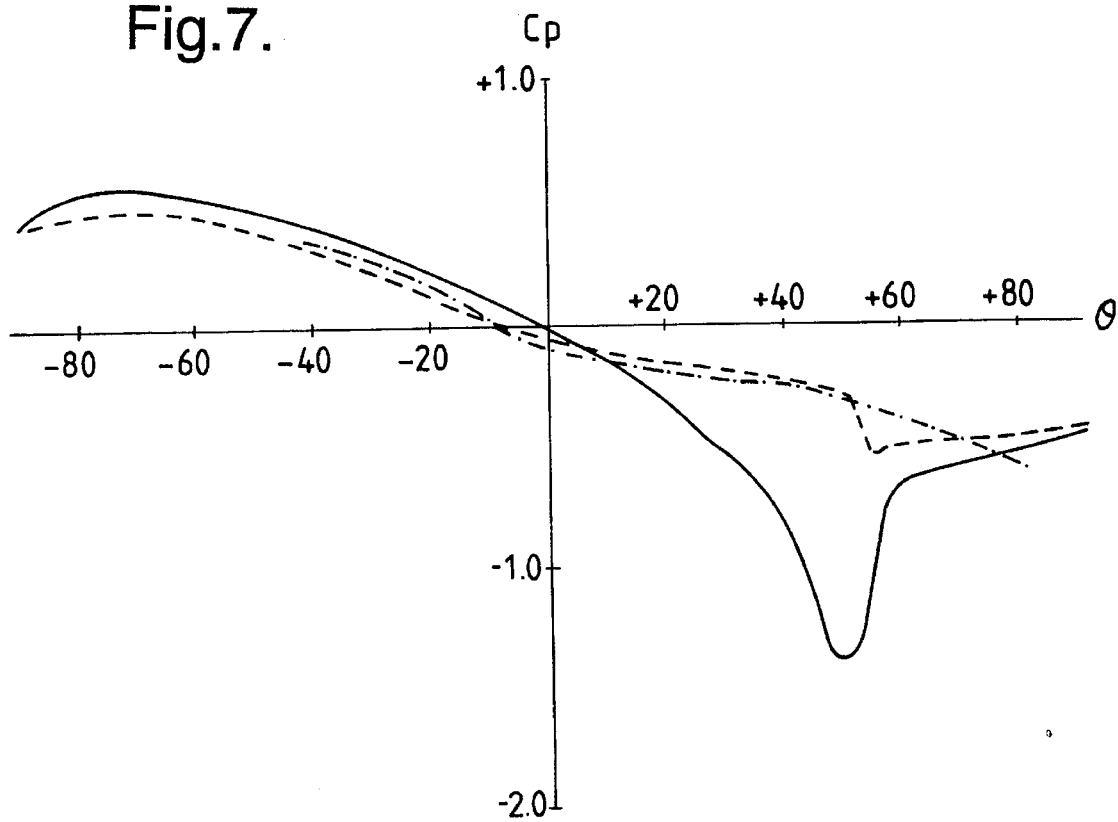

Tests of the prior art static vent unit 11 were undertaken in a wind tunnel, and the results are illustrated in full line in FIG. 7. The tests were conducted using a wind speed of about 100 ft/sec and the graph plots airflow incidence $\theta$ (degrees) against pressure coefficient $C_P$ at the vent port 14. In the tests, a zero airflow incidence angle is airflow from the front of the helicopter generally parallel to the plane of the upper surface 18 of strake 15 as indicated by arrow 19a in FIG. 1. Negative airflow incidence angles refer to a generally downward airflow relative the strake 15 as indicated at 19b, and positive airflow incidence angles refer to a generally upward airflow relative the strake as indicated by arrow 19c in FIG. 1. Positive airflow incidence occurs at high descent rates.

As intended, at negative airflow incidence angles, the surface 18 of strake 15 causes an increase in the pressure coefficient in the vicinity of the vent port 14 to provide a compensating positive pressure to offset the normally negative pressure at the location of the static vent unit 11. However, what was surprising was that at positive airflow incidence angles the pressure coefficient reduced rapidly to a minimum at an incidence angle $\theta$ of about 50 degrees, and thereafter increased rapidly again.

The inventor realised that the strake 15 was acting as a low aspect ratio wing and that this was beneficial when the vent port 14 was located on the "lower or pressure" surface as when negative airflow incidence 19b is applied, but not when it is located on the "upper or suction" surface as when positive airflow incidence 19c is applied.

Figure 8:
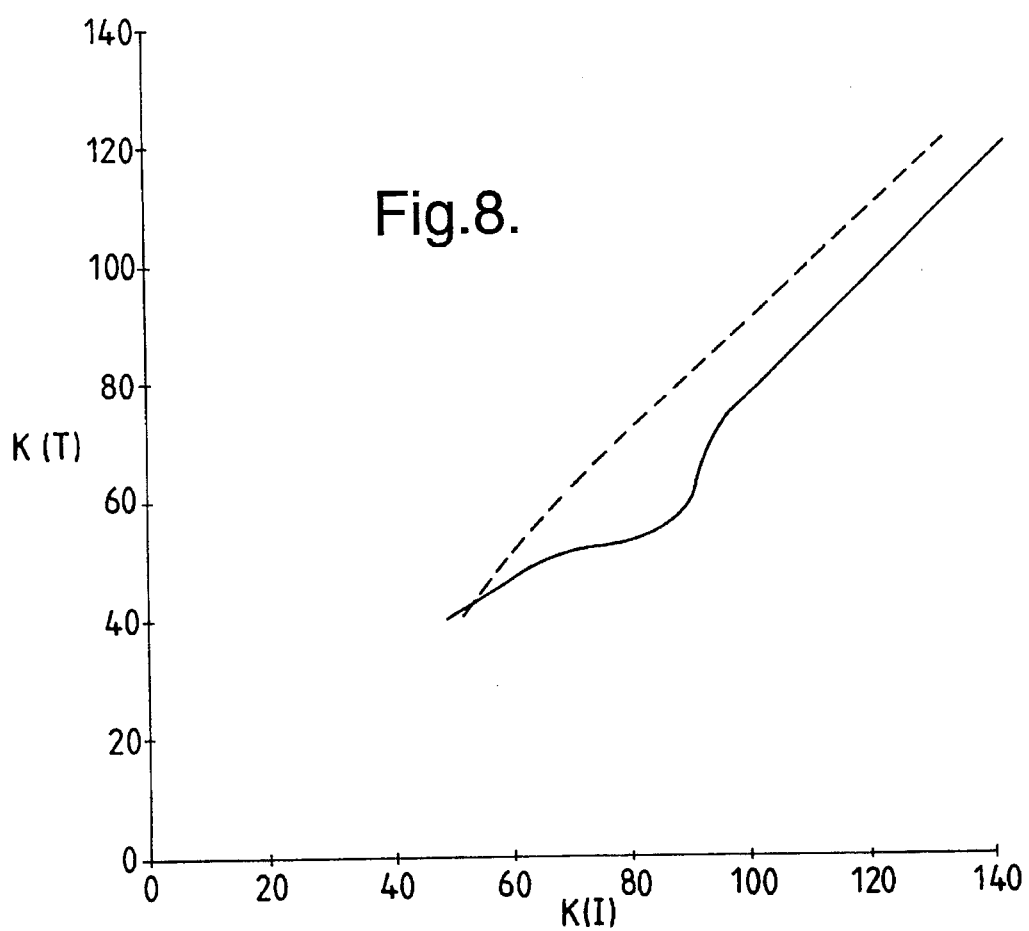

The effect of this significant reduction in the pressure coefficient at the location of the vent port 14 is illustrated in FIG. 8 which plots indicated forward airspeed K(I) against true forward airspeed K(T) at a rate of descent of 4000 ft/min. As can be seen from the plot relating to the prior art static vent unit indicated in full line this results in a significant error between the true airspeed and the indicated airspeed. The error maximises at a true forward airspeed of around 60 knots K(T) when the pilot will see an indicated airspeed of K(I) about 90 knots.

Several expedients were tried in an attempt to solve the problem such as modifying the strake 15 by chamfering a leading edge portion and/or adding a rear ramp, and relocating the vent port 14 relative the strake 15. Whilst some minor improvement was achieved at positive airflow incidence angles, the modifications all resulted in a reduction in the required compensation achieved by the strake 15 at negative airflow incidence angles, and were therefore unacceptable.

The inventor then considered some form of airflow deflection means which would be effective to deflect positive airflow incidence 19c away from the upstanding portion 18 of the strake 15 and which would allow the strake 15 to continue to act as a wing at negative airflow incidence but destroy its lifting ability at positive airflow incidence particularly around the troublesome 50 degree airflow incidence angle.

Figure 2:
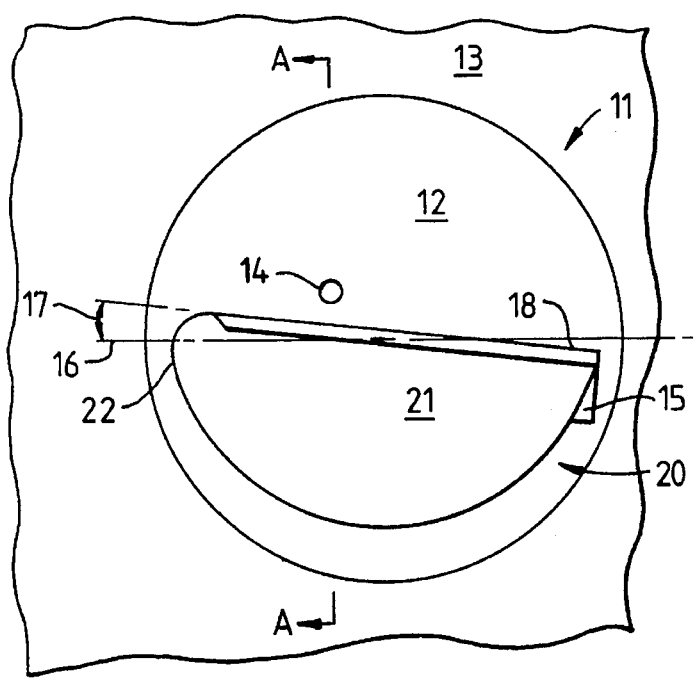
FIG. 2 is a fragmentary side elevation similar to FIG. 1 according to a first embodiment of the invention.
Figure 3:
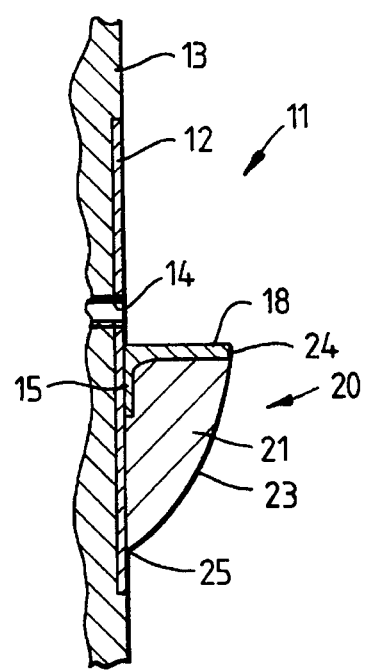
FIG. 3 is a sectioned view taken on lines A—A of FIG. 2.

A first form of airflow deflection means investigated by the inventor is illustrated in FIGS. 2 and 3 in which like reference numerals are used to identify parts corresponding to those of the static vent unit 11 of FIG. 1. Thus, the airflow deflection means generally indicated at 20 comprises a fairing 21 attached to the surface of the support plate 12 beneath the upstanding portion 18 of the strake 15. The fairing 21 extends throughout the length of the strake 15 and has a radiussed nose portion 22 and is generally semi-circular in plan.

An outer surface 23 (FIG. 3) of fairing 21 curves downwardly and inwardly from an upper edge portion 24 corresponding in height to that of the upstanding portion 18 of the strake 15 to a lower edge 25 adjacent the outer surface of the support plate 12.

The results of wind tunnel tests of this embodiment of the invention are illustrated in broken line in FIG. 7 and show a significant improvement by reducing and smoothing the pressure coefficient throughout the range of positive airflow incidence angles between about 15 and 70 degrees, although a sharp reduction of lesser extent is still apparent between about 50 and 55 degrees. It is to be noted that an unillustrated form of fairing 21 having a sharp nose portion represented an improvement over the prior art device by reducing the pressure coefficient at positive airflow incidence although a peak remained at a positive airflow incidence angle of about 30 degrees. This was completely eliminated by incorporation of the radiussed nose portion 22.

A further consideration in respect of this embodiment was that it required a redesign of the static vent unit 11, and also required increased electrical power to provide heat to the unit for de-icing purposes.

The inventor then considered separating the fairing 21 from the static vent unit 11, and such a further embodiment of the invention will now be described with reference to FIGS. 4, 5 and 6 in which again like reference numerals have been used for similar parts.

Thus, the fairing 21, again generally semi-circular in plan, is attached to an external surface of the fuselage 13 below and generally forward of the strake 15 of the static vent unit 11, so as to encompass an anticipated range of positive airflow incidence angles 19c. The fairing 21 has a straight upper edge portion 24 which is located perpendicular to a line extending at an angle of 50 degrees from the surface of the upstanding portion 18 of the strake 15, i.e. so as to be perpendicular to the positive airflow incidence at the angle ($\theta$) at which the maximum negative pressure coefficient had been identified, and the fairing 21 is centred about that same line. The upper edge portion 24 is a bluff surface extending generally perpendicular to the surface of the fuselage 13.

The outer surface 23 of the fairing 21 is again smoothly radiussed and slopes downwardly and inwardly to lower edge 25 adjacent the surface of fuselage 13.

The height and length of the upper edge 24 of fairing 21 is such that the strake 15 is located fully in the wake of the fairing 21 certainly at around the most critical positive airflow incidence angle, and that the airflow is deflected away from the upstanding portion 18. In general, the length and height of the leading edge 24 are likely to be approximately equal to the respective length and height of the upper surface portion 18 of the strake 15. The bluff shape of upper surface 24 also assists in preventing reattachment of the airflow in the region between it and the strake 15.

The result of wind tunnel tests on this embodiment of the invention are also illustrated, in chain dot in FIG. 7. These show a dramatic smoothing of the pressure coefficient throughout the whole range of positive airflow incidence angles when compared with the prior art static vent unit, and also a smoothing in respect of the device of the embodiment of FIGS. 2 and 3. It is to be noted also that the embodiment of FIGS. 4, 5 and 6 has little effect on the pressure coefficient at negative airflow incidence angles and does not therefore detract from performance of the static vent unit 11 during that phase of operation.

The effect of this smoothing of the pressure coefficient at positive airflow incidence angles in respect of the indicated forward airspeed is illustrated in broken line in the plot on FIG. 8. This shows clearly a significant reduction in the error between the true forward airspeed K(T) and the indicated forward airspeed K(I). For example, taking the worst case for the prior art static vent unit 11, a true forward airspeed of 60 knots now translates to an indicated forward airspeed of about 68 knots. This compares very favourably with the indicated airspeed of 90 knots using the unmodified static vent unit.

Figure 4:
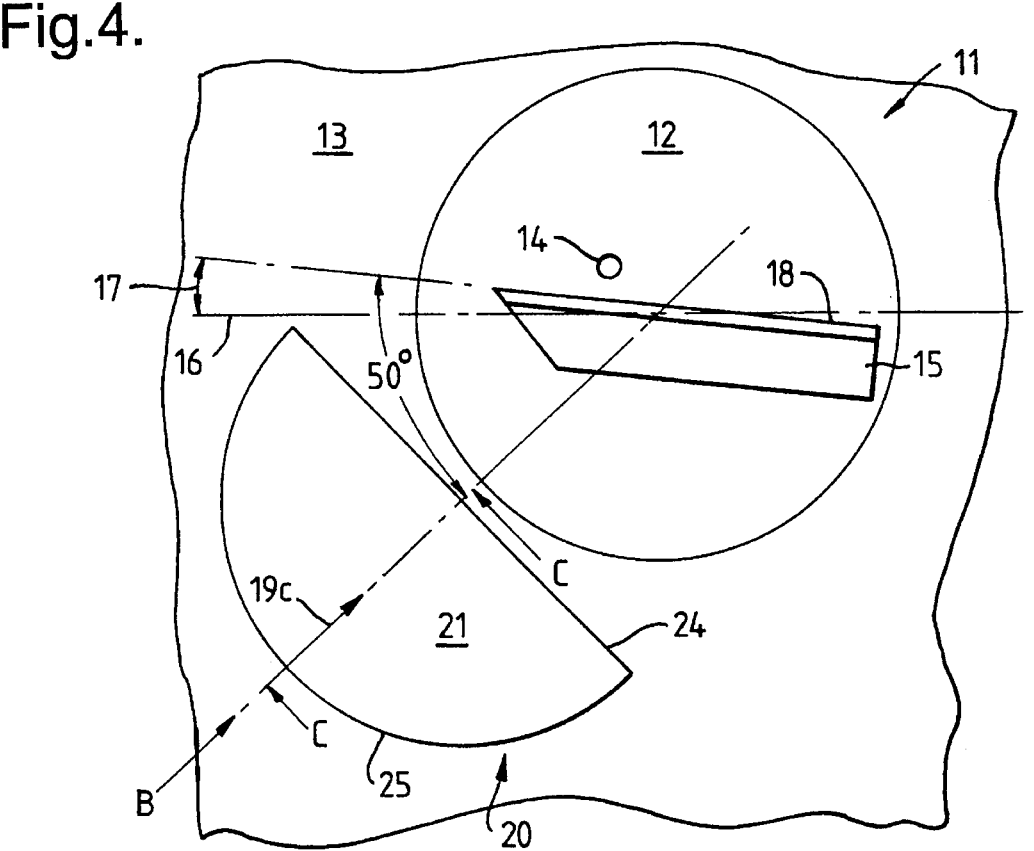
FIG. 4 is a fragmentary side elevation of a static vent unit according to a further embodiment.
Figure 5:
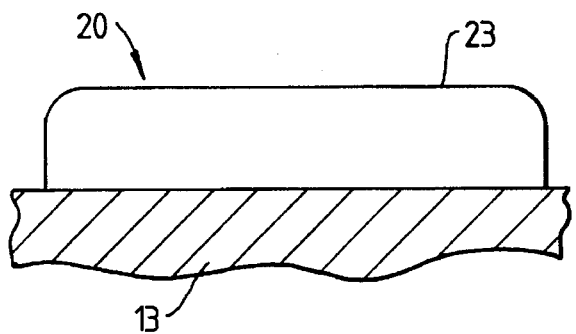
FIG. 5 is a view on arrow B of FIG. 4.
Figure 6:
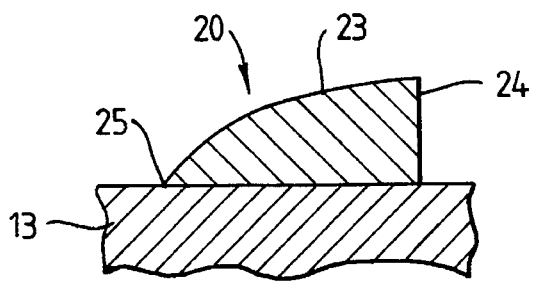
FIG. 6 is a sectioned view taken on lines C—C of FIG. 4, and FIGS. 7 and 8 are graphs illustrating operational features of the static vent units of the prior art and units constructed according to the invention.

It is envisaged that in an unillustrated and simplest form of this invention the airflow deflection means 20 could comprise a second strake device similar to strake 15 but located below and slightly forward in a position corresponding approximately to that of the upper edge 24 of the fairing 21 of the embodiment illustrated in FIGS. 4 to 6 inclusive. Such a device however, might be subject to ice accretion during cruise flight of a helicopter, which could adversely affect normal operation of the static vent unit 11. The smooth, radiussed shape of the outer surface 23 of the fairing 21 of the preferred embodiments is designed to prevent such ice accretion.

Whilst several embodiments have been described and illustrated it will be apparent that many modifications can be made without departing from the scope of the invention as defined in the appended claims. For example, at least the plan shape of the fairings 21 can be changed to suit particular applications and instead of a symmetrical shape can be elongated in a fore and aft direction from the front edge 24 to further reduce the risk of ice accretion and/or for installation considerations. The airflow deflection means 20 can be manufactured from any suitable material and can be attached using either adhesive or mechanical attachment means or be formed in the fuselage skin itself.

What is claimed is:

1. A static vent unit located in the side of a helicopter fuselage with an outer surface of a support plate substantially flush with a surface of the fuselage, a circular vent port through the plate and an elongated strake extending substantially horizontally below the vent port with an upper surface facing the vent port and extending generally perpendicular to said support plate surface, and further including airflow deflection means independent of said elongated strake, said airflow deflection means being located below the strake to deflect airflow away from the perpendicularly extending portion of the strake when the unit is operating in airflow at a positive incidence as herein defined.

2. A unit as claimed in claim 1, wherein said airflow deflection means comprise a fairing below said perpendicularly extending upper surface of the strake.

3. A unit as claimed in claim 2, wherein a length and height of the fairing is approximately equal to the perpendicularly extending upper surface of the strake.

4. A unit as claimed in claim 2, wherein said fairing has a radiussed nose portion.

5. A unit as claimed in claim 2, wherein the fairing is located adjacent the strake and slopes downwardly to a generally sharp lower edge.

6. A unit as claimed in claim 2, wherein the fairing is integral with the strake.

7. A unit as claimed in claim 2, wherein the fairing is remote from the strake and has an upper edge portion located perpendicular to a pre-selected positive airflow incidence angle measured from the horizontal plane of the upper surface of the strake.

8. A unit as claimed in claim 7, wherein said upper edge portion is a bluff edge.

9. A unit as claimed in claim 7, wherein said incidence angle is between 20 degrees and 70 degrees.

10. A unit as claimed in claim 9, wherein said incidence angle is about 50 degrees.

11. A unit as claimed in claim 2, wherein said fairing is generally semi-circular in plan with a generally smooth convex surface.

* * * * *